(12) United States Patent
Nyberg

(10) Patent No.: US 8,044,844 B2
(45) Date of Patent: Oct. 25, 2011

(54) PULSED RADAR LEVEL GAUGE SYSTEM AND METHOD FOR ENERGY EFFICIENT FILLING LEVEL DETERMINATION

(75) Inventor: Håkan Nyberg, Linköping (SE)

(73) Assignee: Rosemount Tank Radar AB, Gotenburg (SE)

( * ) Notice: Subject to any disclaimer, the term of this patent is extended or adjusted under 35 U.S.C. 154(b) by 171 days.

(21) Appl. No.: 12/636,890

(22) Filed: Dec. 14, 2009

(65) Prior Publication Data
US 2011/0140951 A1    Jun. 16, 2011

(51) Int. Cl.
*G01S 13/08*    (2006.01)
(52) U.S. Cl. .................... 342/124; 342/137; 342/100
(58) Field of Classification Search .................. 342/124, 342/137, 84–88, 100
See application file for complete search history.

(56) References Cited

U.S. PATENT DOCUMENTS

| | | | |
|---|---|---|---|
| 4,132,991 A | 1/1979 | Wocher et al. | 343/13 |
| 5,457,990 A | 10/1995 | Oswald et al. | 73/290 |
| 6,072,427 A | 6/2000 | McEwan | 342/175 |
| 6,087,978 A * | 7/2000 | Lalla et al. | 342/124 |
| 6,300,897 B1 * | 10/2001 | Kielb | 342/124 |
| 6,373,428 B1 | 4/2002 | McEwan | 342/175 |
| 6,404,288 B1 | 6/2002 | Bletz et al. | 331/2 |
| 6,628,229 B1 | 9/2003 | Johnson et al. | 342/124 |
| 6,679,115 B2 * | 1/2004 | Heidecke | 73/290 V |

(Continued)

FOREIGN PATENT DOCUMENTS
DE       4219990      6/1992
(Continued)

OTHER PUBLICATIONS

"Written Opinion of the International Searching Authority" for PCT/SE2010/051371 filed Dec. 13, 2010, date of mailing Mar. 25, 2011; 8 pages.

(Continued)

*Primary Examiner* — John Sotomayor
(74) *Attorney, Agent, or Firm* — Westman, Champlin & Kelly, P.A.

(57) ABSTRACT

The invention sets forth a method of determining a filling level of a product contained in a tank using a radar level gauge system. The steps include generating a transmission signal using first pulse generating circuitry outputting a first signal having a first oscillation frequency having a first pulse repetition frequency. The invention uses a second pulse generating circuitry having a resonator element having an input and an output, a reference signal in the form of a second pulse train having a second pulse repetition frequency which differs from the first pulse repetition frequency by a predetermined frequency difference. The invention forms a measurement signal including a sequence of values representing a time correlation between a pulse of the reference signal and the reflected signal, and determines the filling level based on the measurement signal. The step of generating the reference signal includes providing the first signal to the input of the resonator element in the second pulse generating circuitry, monitoring an output signal from the resonator element, the output signal substantially corresponding to the first signal being delayed by a time delay, controlling at least one parameter of the second pulse generating circuitry to a parameter value resulting in the time delay corresponding to the predetermined frequency difference, and providing the output signal from the resonator element to the input of the resonator element while maintaining the parameter value of the at least one parameter, thereby generating the reference signal.

16 Claims, 4 Drawing Sheets

U.S. PATENT DOCUMENTS

| | | | |
|---|---|---|---|
| 6,864,833 B2 * | 3/2005 | Lyon | 342/124 |
| 7,131,325 B2 | 11/2006 | Nilsson et al. | 73/290 |
| 7,710,314 B2 * | 5/2010 | Benari et al. | 342/124 |
| 7,826,309 B2 * | 11/2010 | Spanke et al. | 367/99 |
| 2006/0006953 A1 | 1/2006 | Musch | 331/16 |
| 2007/0103333 A1 * | 5/2007 | Michalski et al. | 340/853.1 |
| 2007/0164833 A1 | 7/2007 | Kottschlag | 331/177 |
| 2008/0024145 A1 | 1/2008 | Schultheiss et al. | 324/644 |
| 2008/0105048 A1 | 5/2008 | Nilsson et al. | 73/290 |
| 2008/0302439 A1 * | 12/2008 | Spanke et al. | 141/1 |
| 2011/0140951 A1 * | 6/2011 | Nyberg | 342/124 |

FOREIGN PATENT DOCUMENTS

| | | |
|---|---|---|
| EP | 2005156393 | 6/2005 |
| JP | 2002-350530 | 12/2002 |
| KR | 100640517 | 10/2006 |

OTHER PUBLICATIONS

"International Search Report" for PCT/SE2010/051371 filed Dec. 13, 2010, date of mailing Mar. 25, 2011; 6 pages.

\* cited by examiner

PULSED RADAR LEVEL GAUGE SYSTEM AND METHOD FOR ENERGY EFFICIENT FILLING LEVEL DETERMINATION

TECHNICAL FIELD OF THE INVENTION

The present invention relates to a method of determining a filling level of a product contained in a tank using a pulsed radar level gauge system, and to a pulsed radar level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems typically have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_r$ that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are synchronized to have the same phase. Due to the frequency difference $\Delta f$, the phase difference between the transmission signal and the reference signal will gradually increase during the measurement sweep.

During the measurement sweep, the reflection signal formed by the reflection of the transmission signal at the surface of the product contained in the tank is being correlated with the reference signal, so that an output signal is only produced when a reflected pulse and a reference pulse occur at the same time. The time from the start of the measurement sweep to the occurrence of the output signal resulting from the correlation of the reflection signal and the reference signal is a measure of the phase difference between the transmission signal and the reflection signal, which is in turn a time expanded measure of the time-of-flight of the reflected pulses, from which the distance to the surface of the product contained in the tank can be determined.

Since the accuracy of the frequency difference $\Delta f$ between the transmission signal and the reference signal is important to the performance of the pulsed radar level gauge system, the second oscillator can be controlled by a regulator that monitors the frequency difference $\Delta f$ and regulates the second oscillator to maintain the predetermined frequency difference $\Delta f$.

To provide a stable regulation, the regulator may typically need in the order of hundreds of samples of the frequency difference $\Delta f$, which corresponds to a time duration which can be as long as 20-30 seconds due to the low value of the frequency difference $\Delta f$ that is desired to achieve a sufficient time expansion.

Accordingly, currently available pulsed radar level gauge systems typically need to be powered for a substantial period of time before the actual filling level measurement can start.

SUMMARY OF THE INVENTION

In view of the above-mentioned and other drawbacks of the prior art, a general object of the present invention is to provide an improved radar level gauge system and method, and in particular a pulsed radar level gauge system and method enabling a more energy efficient filling level determination.

According to a first aspect of the present invention, these and other objects are achieved through a method of determining a filling level of a product contained in a tank using a radar level gauge system, the method comprising the steps of: generating a transmission signal using first pulse generating circuitry outputting a first signal having a first oscillation frequency, the transmission signal being in the form of a first pulse train having a first pulse repetition frequency; generating, using second pulse generating circuitry comprising a resonator element having an input and an output, a reference signal in the form of a second pulse train having a second pulse repetition frequency, the second pulse repetition frequency differing from the first pulse repetition frequency by a predetermined frequency difference; propagating the transmission signal towards a surface of the product contained in the tank; receiving a reflected signal resulting from reflection of the transmission signal at the surface of the product; forming a measurement signal comprising a sequence of values, each value representing a time correlation between a pulse of the reference signal and the reflected signal; and determining the filling level based on the measurement signal, wherein the step of generating the reference signal comprises the steps of: providing the first signal to the input of the resonator element comprised in the second pulse generating circuitry; monitoring an output signal from the resonator element, the output signal substantially corresponding to the first signal being delayed by a time delay; controlling at least one parameter of the second pulse generating circuitry to a parameter value resulting in the time delay corresponding to the predetermined frequency difference; and providing the output signal from the resonator element to the input of the resonator element while maintaining the parameter value of the at least one parameter, thereby generating the reference signal.

It should be noted that none of the methods according to the various aspects of the present invention is limited to performing the steps thereof in any particular order. Furthermore, some steps may be performed at one point in time, and other steps at another point in time.

The tank may be any container or vessel capable of containing a product, and may be metallic, or partly or completely non-metallic, open, semi-open, or closed. Furthermore, the filling level of the product contained in the tank may be determined directly by using a signal propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank. The transmission signal is an electromagnetic signal.

The present invention is based on the realization that, when providing the first signal output by the first pulse generating circuitry to the input of the resonator element, the time delay between the first signal and the output signal from the resonator element is proportional to the frequency difference between the first signal and the output signal from the resonator element when the output signal from the resonator element provided to the input of the resonator element, that is, when the resonator element in the second pulse generating circuitry is arranged in an oscillator circuit configuration. Put in another way, the present inventor has realized that frequency difference between the signals output by the first pulse generating circuitry and the second pulse generating circuitry can be controlled by controlling at least one parameter of the second pulse generating circuitry to obtain a desired time delay (corresponding to the predetermined frequency difference) between the output and the input of the resonator element when the radar level gauge system is in a first state and then switching the radar level gauge system to a second state in which the second pulse generating circuitry is operated in a feedback configuration with the same parameter setting that resulted in the desired time delay when the radar level gauge system was in the first state.

The present inventor has further realized that a stable frequency difference can be achieved much faster by regulating the second pulse generating circuitry based on the time delay than based on direct measurements of the frequency difference, since new samples of the time delay can be acquired at the pulse repetition frequency of the second pulse generating circuitry.

Since the pulse repetition frequency may be around $10^6$ times higher than the frequency difference, the startup time can be reduced correspondingly, which provides for a far more energy efficient pulsed radar level gauge system.

This effect obtained through the various embodiments of the present invention is expected to be of particular importance to radar level gauge systems that are not connected to fixed power lines, but are powered locally through one or several batteries or other local power source(s).

In prior art systems, the minimum time between starting times of two subsequent measurement sweeps corresponds to one full period of the predetermined frequency difference, since the signals output by the first pulse generating circuitry and the second pulse generating circuitry should be in phase at the start of a measurement sweep.

Furthermore, to allow for direct regulation according to the prior art of the frequency difference for each measurement sweep, each measurement sweep should last a full period of the predetermined frequency difference.

Usually, due to the typical value of the frequency difference and the measurement ranges involved, only a part of such a measurement sweep lasting a full period of the frequency difference is needed to determine the filling level.

Through the method according to the present invention, the first pulse generating circuitry and the second pulse generating circuitry can be controlled to operate in phase and in such a way that the desired frequency difference is obtained much more frequently than was possible with prior art methods. Accordingly, the measurement sweep can be restarted after a much shorter time than was previously possible. As a result, electrical power and time can be saved. The duration of the measurement sweep can, through the various embodiments of the present invention, be determined practically at will (with the minimum increment being determined by the pulse repetition frequency of the first/second pulse generating circuitry), and can thus be tuned based on factors such as the dimensions of the tank and/or the anticipated filling level etc.

The step of controlling may advantageously comprise the step of controlling a reactive load across the resonator element comprised in the second pulse generating circuitry. The delay of a signal fed to the second pulse generating circuitry in such a way that it passes through the resonator element can conveniently be controlled by controlling the reactive load across the resonator element. When the second pulse generating circuitry is arranged in an oscillator configuration, with the signal at the output of the resonator element being fed back to the input of the resonator element, the reactive load across the resonator element determines the resonance frequency of the second pulse generating circuitry.

As an alternative or complement to controlling a reactive load across the resonator element, the time delay can be controlled by controlling the electric and/or mechanical properties of the resonator element itself.

Furthermore, the second pulse generating circuitry may comprise a voltage controlled capacitor, and the step of controlling the reactive load may comprise the step of controlling a voltage applied across the voltage controlled capacitor. This is a convenient way of controlling the reactive load across the resonator element. One type of voltage controlled capacitor is often referred to as a varactor or a varactor diode.

According to various embodiments, the method according to the present invention may further comprise the step of delaying at least one of the transmission signal and the reference signal to compensate for the delay in the second pulse generating circuitry. Hereby, the time from switching the radar level gauge system to the second state until the transmission signal and the reference signal are in phase can be shortened. As a consequence, the time before starting a measurement sweep can be reduced, which provides for a reduced energy consumption of the radar level gauge system.

In case the frequency difference between the transmission signal and the reference signal is controlled such that the frequency of the reference signal is slightly lower than that of the transmission signal, the transmission signal may advantageously be delayed such that a first pulse in the first pulse train occurs at a later time than a first pulse in the second pulse train.

Alternatively, the frequency difference between the transmission signal and the reference signal may be controlled such that the frequency of the reference signal is slightly higher than that of the transmission signal. In this case, the reference signal may advantageously be delayed such that a first pulse in the second pulse train occurs at a later time than a first pulse in the first pulse train.

According to a second aspect of the present invention, the above-mentioned and other objects are achieved through a radar level gauge system, for determination of a filling level of a product contained in a tank, the radar level gauge system comprising first pulse generating circuitry having an output for outputting a first signal having a first oscillation frequency, for generating a transmission signal in the form of a first pulse train having a first pulse repetition frequency; second pulse generating circuitry comprising a resonator element having an input and an output, for generating a reference signal in the form of a second pulse train having a second pulse repetition frequency, the second pulse repetition frequency differing from the first pulse repetition frequency by a predetermined frequency difference; a propagation device connected to the first pulse generating circuitry and arranged to propagate the transmission signal towards a surface of the product inside the tank, and to return a reflected signal resulting from reflection of the transmission signal at the surface of the product contained in the tank; measurement circuitry connected to the propagation device and connectable to said second pulse generating circuitry, said measurement circuitry being configured to form a measurement signal comprising a sequence of values, each value representing a time correlation between a pulse of the reference signal and the reflected signal; and processing circuitry connected to the measurement circuitry for determining a filling level based on the measurement signal, wherein the radar level gauge system further comprises: a switching element that is controllable to switch the radar level gauge system between: a first state for calibration of the frequency difference, in which the output of the first pulse generating circuitry is connected to the input of the resonator element comprised in the second pulse generating circuitry; and a second state for measurement of the filling level, in which the output of the resonator element comprised in the second pulse generating circuitry is connected to the input of the resonator element comprised in the second pulse generating circuitry and to said measurement circuitry.

According to one embodiment, the propagation device may be a probe arranged to extend towards and into the product contained in the tank for guiding the transmission signal towards the surface of the product, and guiding the reflected signal back along the probe.

According to another embodiment, the propagation device may comprise an antenna device for radiating the transmission signal towards the surface of the product contained in the tank and capturing the reflected signal resulting from reflection of the transmission signal at the surface of the product contained in the tank.

It should be noted that any one or several of the means comprised in the processing circuitry may by provided as either of a separate physical component, separate hardware blocks within a single component, or software executed by one or several microprocessors.

Either or both of the first pulse generating circuitry and the second pulse generating circuitry may be provided in the form of a voltage controlled oscillator circuit, which may comprise a crystal oscillator. Alternatively, either or both of the first pulse generating circuitry and the second pulse generating circuitry may comprise a resonator element formed by electronic circuitry comprising a portion with inductive characteristics and a portion with capacitive characteristics.

The measurement circuitry may, for example, comprise a mixer and the measurement signal may be formed by mixing the reference signal and the reflected signal such that a pulse indicating time correlation is generated each time a reference pulse passes the time domain for the reflected signal. The pulses can then be provided to a sample-and-hold circuit to form a continuous signal.

The switching element that is controllable to switch the radar level gauge system between the first state for calibration of the frequency difference and the second state for measurement of the filling level may, for example, be provided in the form of one or several electronic switches. To provide for the desired signal isolation between the transmission signal and the reference signal, it may be desirable to provide the switching element in the form of at least two electronic switching elements arranged in series.

According to various embodiments of the present invention, the radar level gauge system may further comprise monitoring circuitry arranged to monitor a time delay of the output signal from the resonator element relative to the first signal, when the radar level gauge system is in the first state; and a control unit arranged to control at least one parameter of the second pulse generating circuitry to a parameter value resulting in the time delay corresponding to the predetermined frequency difference.

It should be noted that there is a relation between the time delay of a signal passing through the second pulse generating circuitry when the radar level gauge system is in its first state and the frequency of the signal generated by the second pulse generating circuitry when the radar level gauge system is in its second state. This relation may be determined for the second pulse generating circuitry and the result may be stored, for example in the form of a lookup table or similar. This may advantageously be done prior to deployment of the radar level gauge system, but may also be done after having installed the radar level gauge system on site. For example, the lookup table or similar may be stored in a non-volatile memory comprised in the radar level gauge system.

The second pulse generating circuitry may comprise a controllable reactive load across the resonator element.

When this is the case, the control unit may be arranged to control the reactive load to thereby enable control of the time delay to a time delay value corresponding to the desired frequency difference between the transmission signal and the reference signal.

The controllable reactive load may advantageously comprise a voltage controlled capacitor, whereby the reactive load across the resonator element in the second pulse generating circuitry can be controlled by controlling the voltage across the voltage controlled capacitor.

Moreover, the radar level gauge system may advantageously further comprise a delay device arranged between the first pulse generating circuitry and the propagation device for delaying the transmission signal before propagating the transmission signal towards the surface of the product contained in the tank. Alternatively, or in combination therewith, the radar level gauge system may comprise a delay device arranged between the second pulse generating circuitry and the measurement circuitry for delaying the reference signal.

Such a delay device or delay devices may, for example, be provided in the form of RC-circuitry, LC-circuitry, various electric filter constructions etc, or in any other way known to the skilled person. Depending on which of the transmission signal and the reference signal has the higher frequency, the delay device(s) may be dimensioned to either delay the transmission signal by such a delay time that a first pulse in the first pulse train occurs at a later time than a first pulse in the second pulse train, or delay the reference signal by such a delay time that a first pulse in the second pulse train occurs at a later time than a first pulse in the first pulse train.

Furthermore, when the radar level gauge system is in the first state, the output of the resonator element comprised in the second pulse generating circuitry may be unconnected to the input of the resonator element comprised in the second pulse generating circuitry; and when the radar level gauge system is in the second state the output of the first pulse generating circuitry may be unconnected to the input of the resonator element comprised in the second pulse generating circuitry.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the present detailed description, various embodiments of the radar level gauge system according to the present invention are mainly discussed with reference to a pulsed radar level gauge system of the non-contact type, in which an electromagnetic signal is propagated towards the product contained in the tank using a propagating device in the form of a radiating antenna, such as a cone antenna, a horn antenna, an array antenna or a patch antenna.

It should be noted that this by no means limits the scope of the present invention, which is equally applicable to pulsed guided wave radar (GWR) level gauge system utilizing a propagating device in the form of a probe, such as a single line probe (including a so-called Goubau probe), a two-lead probe, a coaxial probe, etc.

Figure 1:
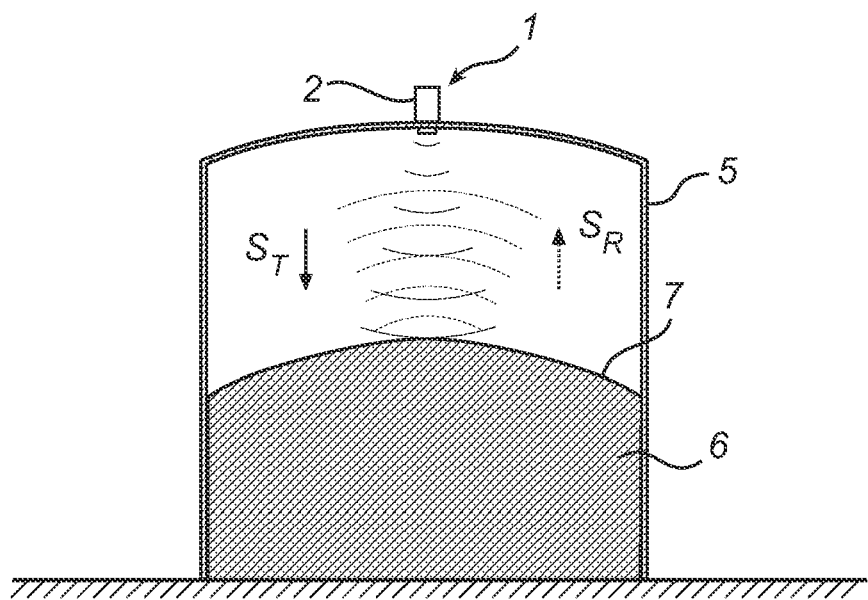
FIG. 1 schematically illustrates a radar level gauge system according to an embodiment of the present invention installed in an exemplary tank containing a solid.

FIG. 1 schematically illustrates a radar level gauge system 1 according to an embodiment of the present invention, comprising a measurement electronics unit 2, and a propagation device in the form of a radiating antenna device 3. The radar level gauge system 1 is provided on a tank 5, which is partly filled with a product 6 to be gauged. In the case illustrated in FIG. 1, the product 6 is a solid, such as grain or plastic pellets, but the product may equally well be a liquid, such as water or a petroleum-based product. By analyzing a transmission signal $S_T$ being radiated by the antenna device 3 towards the surface 7 of the product 6, and a reflected signal $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface present in the tank 5 can be measured in a similar manner.

Figure 2:
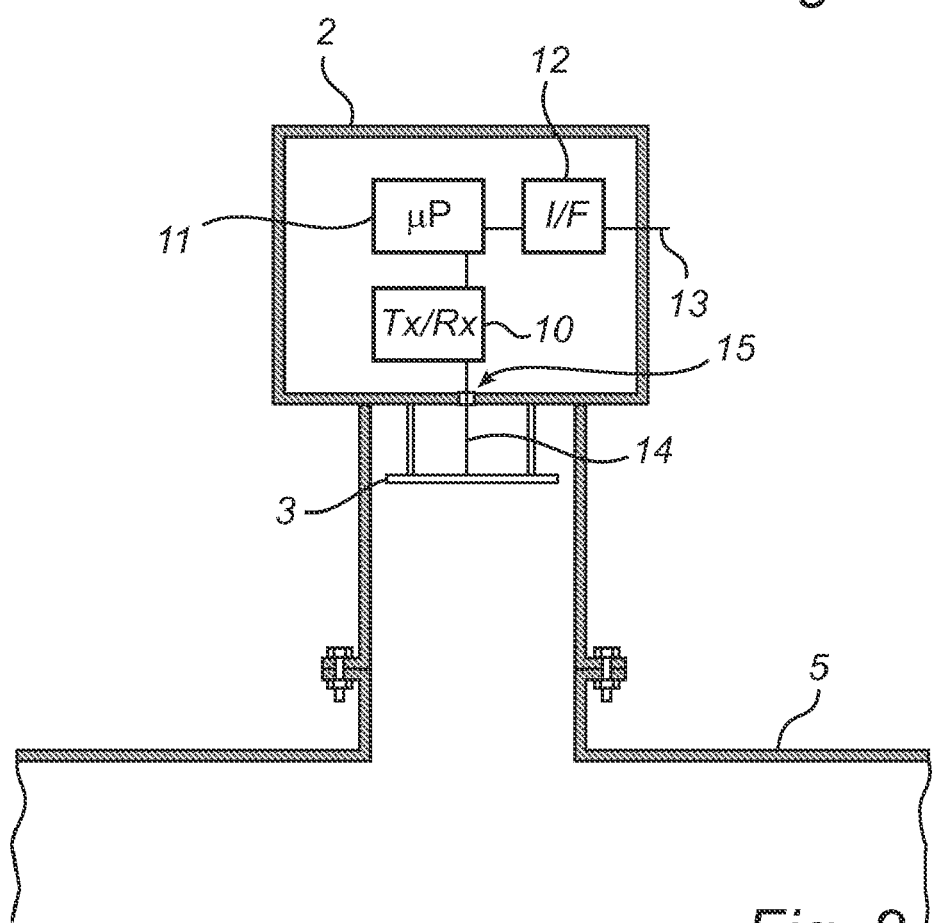
FIG. 2 is a schematic illustration of the measurement electronics unit comprised in the radar level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be powered locally, and may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the antenna device 3 via a conductor 14 passing through a feed-through 15 provided in the tank wall. It should be understood that this is not necessarily the case, and that at least the transceiver 10 may be provided in the interior of the tank 5. For example, in case the antenna device 3 is provided in the form of a patch antenna as is schematically illustrated in FIG. 2, at least the transceiver 10 and the patch antenna 3 may be provided on the same circuit board.

Figure 3:
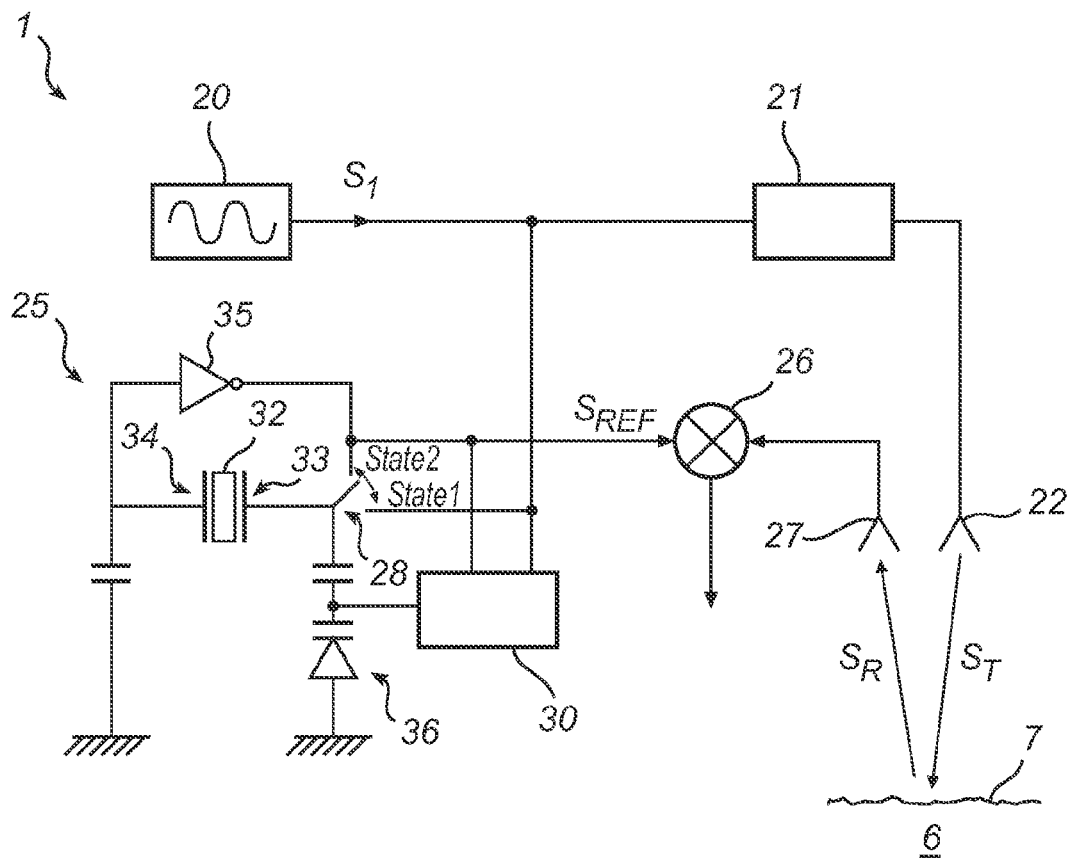
FIG. 3 is a block diagram schematically illustrating the radar level gauge system in FIG. 1.

FIG. 3 is a block diagram schematically showing functional components comprised in the radar level gauge system in FIG. 1. The exemplary radar level gauge system 1 comprises a transmitter branch for generating and transmitting a transmission signal $S_T$ towards the surface 7 of the product 6 contained in the tank (not shown in FIG. 3), and a receiver branch for receiving and operating on the reflected signal $S_R$ resulting from reflection of the transmission signal $S_T$ at the surface 7 of the product 6.

The transmitter branch comprises first pulse generating circuitry in the form of first pulse generator 20, a delay device 21 and a transmitter antenna 22, and the transmitter branch comprises second pulse generating circuitry 25, measurement circuitry, here in the form of a mixer 26, and a receiver antenna 27. The radar level gauge system 1 further comprises a switch 28 and a measurement control unit 30 for controlling the measurement operation of the radar level gauge system 1.

The second pulse generating circuitry 25 is here provided in the form of a voltage controlled crystal oscillator with a resonator element in the form of a crystal oscillator 32 having an input 33 and an output 34, an inverting amplifier 35 and a controllable reactive load in the form of a capacitor diode 36 arranged between the input 33 of the crystal oscillator 32 and ground.

Through the switch 28, the radar level gauge system 1 is controllable between a first state in which the input 33 of the crystal oscillator 32 is connected to the signal output by the first pulse generator 20, and a second state in which the input 33 of the crystal oscillator 32 is instead connected to the output 34 of the crystal oscillator 32 via the inverting amplifier 35 in a typical oscillator feedback configuration.

In measurement operation, the radar level gauge system 1 is controlled to be in the second state, which results in the first pulse generator 20 and the second pulse generating circuitry 25 operating independently. The signal generated by the first pulse generator 20 is delayed by the delay device 21 before it is radiated towards the surface 7 of the product 6 by the transmitting antenna 22 as the transmission signal $S_T$.

The transmission signal $S_T$ is reflected at the surface 7 or the product 6 in the tank, and the reflected signal $S_R$ is received by the receiver antenna 27 and fed to the mixer 26. Due to the time of flight from the transmitter antenna 22 to the surface 7 and back to the receiver antenna 27, the reflected signal $S_R$ is in principle a delayed version of the transmission signal $S_T$. However, the delay is typically so small that it is practically impossible to measure it directly with a sufficient level of accuracy.

Therefore, a time correlation is performed in the mixer 26 between the reflected signal $S_R$ and the reference signal $S_{REF}$ that is output by the second pulse generating circuitry 25. The reference signal $S_{REF}$ is a signal that differs in frequency from the signal output by the first pulse generator 20, by a predetermined frequency difference $\Delta f$. When a measurement sweep starts, the reference signal $S_{REF}$ and the transmission signal $S_T$ are in phase, and then the time until the reference signal "catches up with" the reflected signal $S_R$ is determined. From this time and the frequency difference $\Delta f$, the distance to the surface 7 can be determined.

The time-expansion technique that was briefly described in the previous paragraph is well known to the person skilled in the art, and is widely used in pulsed radar level gauge systems.

As is readily understood by the skilled person, a reliable and accurate measurement of the filling level requires precise regulation of the frequency difference $\Delta f$. For typical prior art radar level gauge systems, as was mentioned in the background section, such precise regulation requires monitoring and regulating the frequency difference $\Delta f$ over a large number of periods of the frequency difference, which can be a relatively long time, since the frequency difference $\Delta f$ is typically relatively small, such as in the range of Hz or tens of Hz.

This time for regulating the frequency difference $\Delta f$ can be shortened dramatically through the radar level gauge system according to the various embodiments of the invention, as will be described below for the exemplary radar level gauge system 1 in FIG. 3.

In order to regulate/calibrate the frequency difference at power up of the radar level gauge system 1 and/or between measurement sweeps, the switch 28 is operated to control the radar level gauge system 1 to the first state where the output of the first pulse generator 20 is connected to the input 33 of the crystal oscillator 32. The signal at the output 34 of the crystal oscillator 32 will be a signal with the same frequency as the input signal, but with a time delay $t_d$ that depends on the properties of the second pulse generating circuitry 25. In particular, the time delay $t_d$ can be controlled between a minimum time delay $t_{d,min}$ and a maximum time delay $t_{d,max}$ by controlling the voltage across the capacitor diode 36. Since the time delay is controllable by using the same parameter, namely the voltage across the capacitor diode 36, as is used to control the frequency difference $\Delta f$ when the radar level gauge system 1 is in its second state, there exists a one-to-one relation between values of the time delay $t_d$ when the radar level gauge system is in its first state and the frequency difference $\Delta f$ when the radar level gauge system is in its second state.

Thus, the frequency difference $\Delta f$ can be regulated indirectly by switching the radar level gauge system to its first state and regulating the time delay $t_d$ and then switching back to the second state while maintaining the voltage across the capacitor diode 36, which yielded the desired time delay $t_d$.

The regulation of the time delay $t_d$ can take place at the frequency of the reference signal $S_{REF}$ which is much higher than the frequency difference $\Delta f$. Accordingly, the time to achieve a stable and regulated frequency difference $\Delta f$ can be reduced from seconds to microseconds, which has a large impact on the power consumption of the radar level gauge system 1.

It should be noted that the radar level gauge system 1 illustrated in FIG. 3 has been simplified and that radar level gauge systems according to various embodiments of the present invention may typically comprise additional components, such as high frequency pulse generators on the transmitter branch and the receiver branch whereby pulses each formed by an amplitude modulated pulse train can be used for determining the filling level.

Additionally, as was briefly described above with reference to FIG. 2, the radar level gauge system 1 comprises processing circuitry (not shown in FIG. 3) that is connected to the measurement circuitry 26 for determining the filling level of the product 6 contained in the tank.

Figure 4:
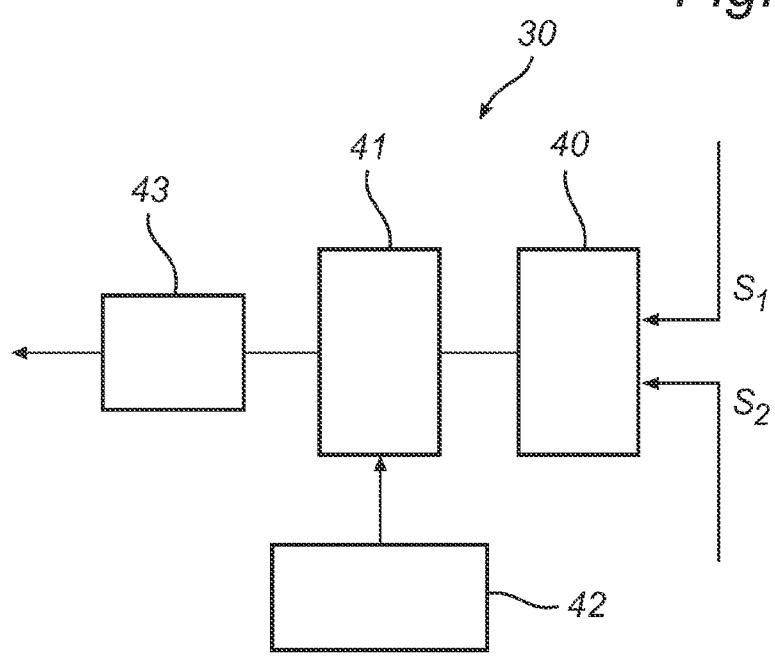
FIG. 4 schematically illustrates an exemplary embodiment of the regulator in FIG. 3.

With reference to FIG. 4, an exemplary configuration of the measurement control unit 30 in FIG. 3 will now be described.

When the radar level gauge system 1 is FIG. 3 is in its first state, the output signal from the first signal generator 20 and the same signal being delayed through passage through the second pulse generating circuitry 25 are both provided to a time delay detector 40. From the time delay detector 40, the detected time delay is provided to a regulator 41, which compares the detected time delay with a desired time delay, that is stored in a non-volatile memory 42. As a result of the comparison, the regulator outputs a voltage which is provided between the input 33 of the crystal oscillator 32 and the capacitor diode 36 in the second pulse generating circuitry 25 to regulate the time delay $t_d$ towards the desired time delay $t_{d,desired}$ which corresponds to the predetermined frequency difference $\Delta f$. Between the regulator 41 and the second pulse generating circuitry 25 a sample-and-hold amplifier 43 is provided for maintaining the voltage across the capacitor diode 36 when the radar level gauge system 1 is controlled to its second state and a measurement is performed.

In this context it should be noted that the sample-and-hold amplifier 43 is simply an illustrative example of a device capable of maintaining a voltage level over a given time, and that there are various other devices that can provide the desired functionality, as is well known to the person skilled in the art.

It should be noted that the time delay detector 40 might equally well detect the phase difference between the signals, which is equivalent to the delay of the signal having passed through the second pulse generating circuitry 25.

The relations between the various signals in the radar level gauge system 1 in FIG. 3 when it is in its first and second state, respectively, will now be briefly described with reference to FIGS. 5a-b.

Figure 5A:
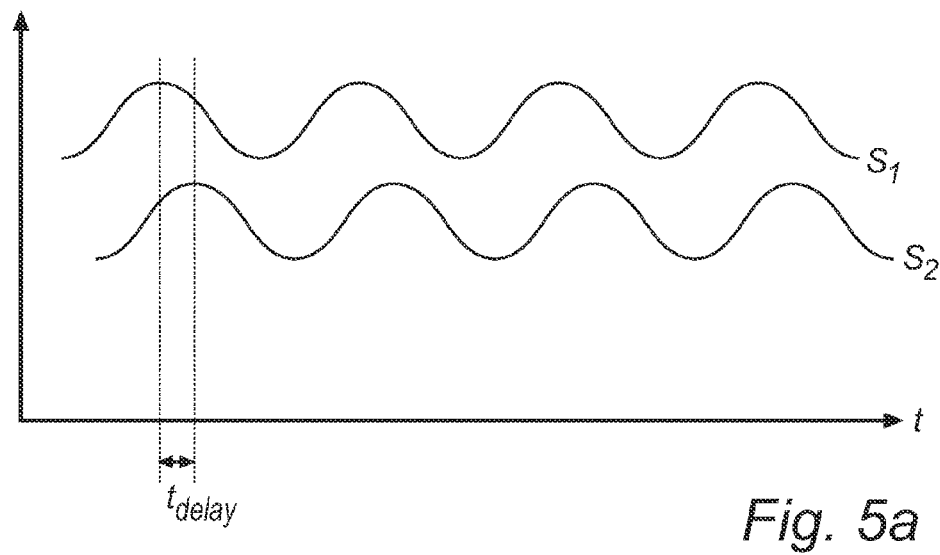
FIGS. 5a-b schematically illustrate signals present in the radar level gauge system in FIG. 3 when it is in its first and second states, respectively.

In FIG. 5a, examples are shown of the signals input to the measurement control unit 30 when the radar level gauge system 1 is in its first state as was described above in connection with FIGS. 3 and 4.

As can be seen in FIG. 5a, the signal $S_1$ output by the first pulse generator 20 and the delayed signal $S_2$ that is present at the output 34 of the crystal oscillator have the same frequency, but there is a time delay $t_d$ that is determined by the properties of the crystal oscillator 32 and the settings of the second pulse generating circuitry, specifically the voltage across the capacitor diode 36.

Figure 5B:
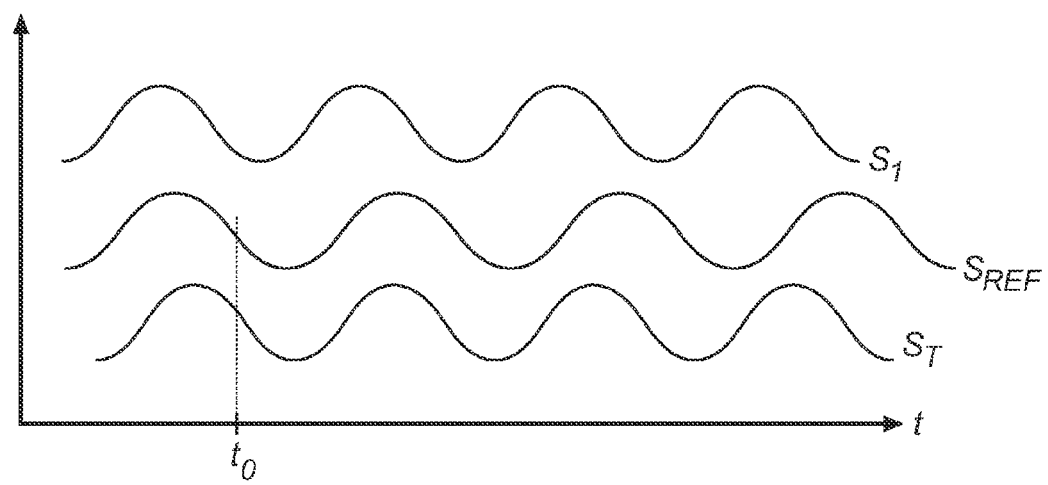

FIG. 5b illustrates various signals present in the radar level gauge system 1 when it is in its second state, the measurement state. When switching the radar level gauge system 1 from the first state to the second state while maintaining the voltage across the capacitor diode 36, the signal $S_{REF}$ output by the second pulse generating circuitry 25 will have the same frequency as the signal $S_1$ output by the first pulse generator 20, but be delayed by the time delay $t_d$. When the measurement sweep starts, the transmission signal $S_T$ and the reference signal $S_{REF}$ should be in phase. To shorten the time from setting the radar level gauge system 1 in its second state to the time when the measurement sweep can start, the signal $S_1$ output by the first pulse generator 20 is therefore delayed by a given time so that the first pulse of the transmission signal $S_T$ after the radar level gauge system 1 has been set in its second state is delayed relative to the reference signal $S_{REF}$. Hereby, the reference signal $S_{REF}$ will "catch up with" the transmission signal after a relatively short time, signaling the start of the measurement sweep.

An embodiment of the method according to the present invention will now be described with reference to the flow chart in FIG. 6.

Figure 6:
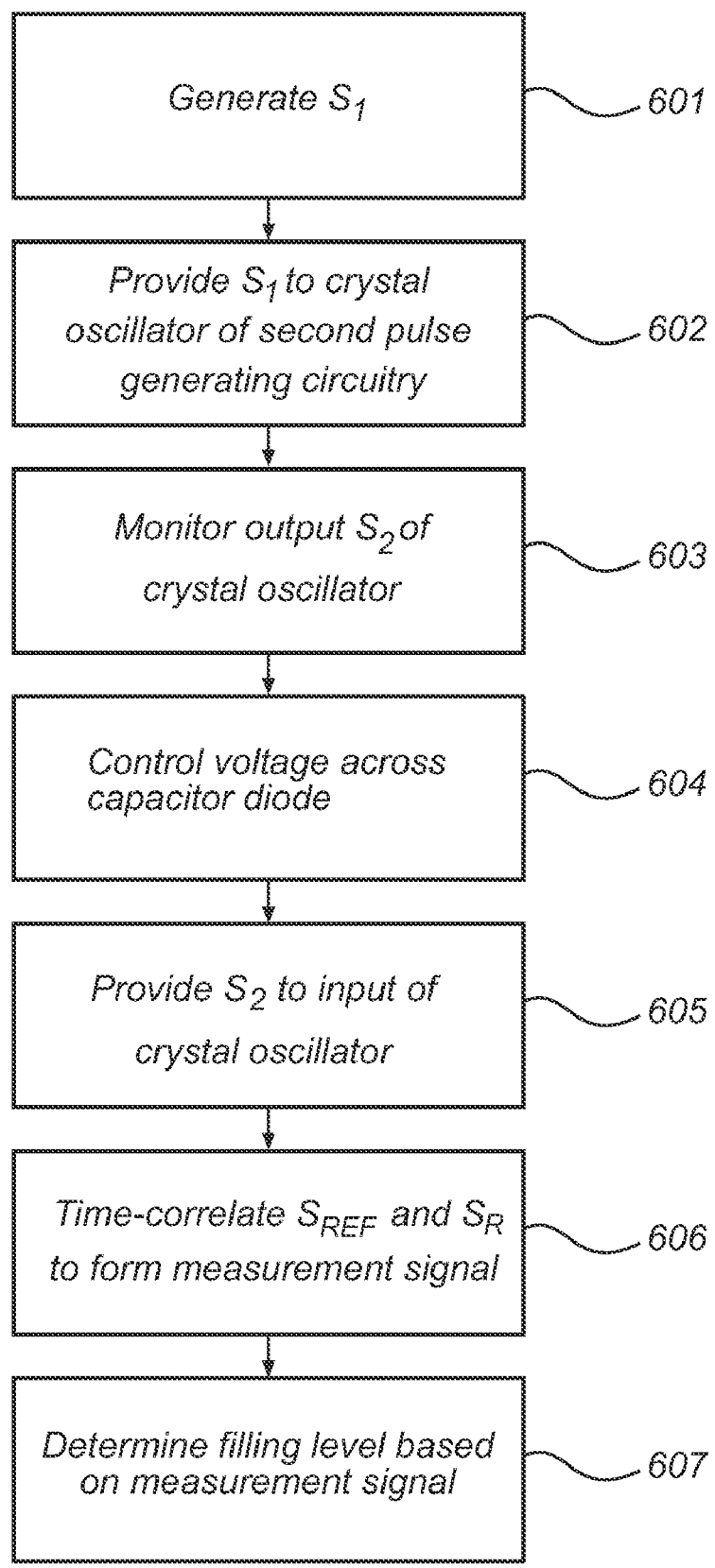
FIG. 6 is a flow chart schematically illustrating an embodiment of the method according to the present invention.

Referring to FIG. 6, calibration/regulation of the frequency difference is performed in steps 601-604 when the radar level gauge system is in its first state, and a measurement sweep is performed in steps 605-607 when the radar level gauge system is in its second state. These sets of steps may be performed in succession as is indicated in FIG. 6, or several measurement sweeps may be performed after one calibration/regulation operation.

In step 601, a first signal $S_1$ is generated by the first pulse generator. This first signal $S_1$ is provided to the input 33 of the crystal oscillator 32 in the subsequent step 602. Thereafter, in step 603, the output $S_2$ from the crystal oscillator 32 is monitored, and the voltage over the capacitor diode 36 in the second pulse generating circuitry 25 is controlled in step 604 to control the time delay $t_d$ between the signals $S_1$, $S_2$ to the desired time delay $t_{d,desired}$ that corresponds to the predetermined frequency difference $\Delta f$.

In the next step 605, the radar level gauge system is controlled to its second state and the output signal $S_2$ from the crystal oscillator 32 is provided to the input 33 of the crystal oscillator 32 while maintaining the voltage across the capacitor diode 36. Thereafter, the reflected signal $S_R$ and the reference signal $S_{REF}$ output by the second pulse generating circuitry 25 are time correlated in the mixer 26 in step 606. Finally, in step 607, the filling level is determined by the processing circuitry based on the result of the time correlation.

What is claimed is:

1. A method of determining a filling level of a product contained in a tank using a radar level gauge system, said method comprising the steps of:
generating a transmission signal using first pulse generating circuitry outputting a first signal having a first oscillation frequency, said transmission signal being in the form of a first pulse train having a first pulse repetition frequency;
generating, using second pulse generating circuitry comprising a resonator element having an input and an output, a reference signal in the form of a second pulse train having a second pulse repetition frequency, said second pulse repetition frequency differing from said first pulse repetition frequency by a predetermined frequency difference;
propagating said transmission signal towards a surface of said product contained in the tank;
receiving a reflected signal resulting from reflection of said transmission signal at said surface of said product;
forming a measurement signal comprising a sequence of values, each value representing a time correlation between a pulse of the reference signal and the reflected signal; and
determining said filling level based on said measurement signal,
wherein said step of generating said reference signal comprises the steps of:
providing said first signal to said input of the resonator element comprised in said second pulse generating circuitry;
monitoring an output signal from said resonator element, said output signal substantially corresponding to said first signal being delayed by a time delay;
controlling at least one parameter of said second pulse generating circuitry to a parameter value resulting in said time delay corresponding to said predetermined frequency difference; and
providing said output signal from said resonator element to said input of the resonator element while maintaining said parameter value of said at least one parameter, thereby generating said reference signal.

2. The method according to claim 1, wherein said step of controlling comprises the step of:
controlling a reactive load across said resonator element comprised in said second pulse generating circuitry.

3. The method according to claim 2, wherein said second pulse generating circuitry comprises a voltage controlled capacitor, and said step of controlling said reactive load comprises the step of:
controlling a voltage applied across said voltage controlled capacitor.

4. The method according to claim 1, further comprising the step of delaying at least one of said transmission signal and said reference signal.

5. The method according to claim 4, wherein said transmission signal is delayed such that a first pulse in said first pulse train occurs at a later time than a first pulse in said second pulse train.

6. The method according to claim 4, wherein said reference signal is delayed such that a first pulse in said second pulse train occurs at a later time than a first pulse in said first pulse train.

7. A radar level gauge system, for determination of a filling level of a product contained in a tank, said radar level gauge system comprising:
first pulse generating circuitry having an output for outputting a first signal having a first oscillation frequency, for generating a transmission signal in the form of a first pulse train having a first pulse repetition frequency;
second pulse generating circuitry comprising a resonator element having an input and an output, for generating a reference signal in the form of a second pulse train having a second pulse repetition frequency, said second pulse repetition frequency differing from said first pulse repetition frequency by a predetermined frequency difference;
a propagation device connected to said first pulse generating circuitry and arranged to propagate said transmission signal towards a surface of said product inside the tank, and to return a reflected signal resulting from reflection of said transmission signal at said surface of the product contained in the tank;
measurement circuitry connected to said propagation device and connectable to said second pulse generating circuitry, said measurement circuitry being configured to form a measurement signal comprising a sequence of values, each value representing a time correlation between a pulse of the reference signal and the reflected signal; and processing circuitry connected to said measurement circuitry for determining a filling level based on said measurement signal, wherein said radar level gauge system further comprises:

a switching element that is controllable to switch said radar level gauge system between:

a first state for calibration of said frequency difference, in which said output of the first pulse generating circuitry is connected to said input of the resonator element comprised in said second pulse generating circuitry; and a second state for measurement of said filling level, in which said output of the resonator element comprised in said second pulse generating circuitry is connected to said input of the resonator element comprised in said second pulse generating circuitry and to said measurement circuitry.

8. The radar level gauge system according to claim 7, further comprising:

monitoring circuitry arranged to monitor a time delay of said output signal from said resonator element relative to said first signal, when said radar level gauge system is in said first state; and a control unit arranged to control at least one parameter of said second pulse generating circuitry to a parameter value resulting in said time delay corresponding to said predetermined frequency difference.

9. The radar level gauge system according to claim 8, wherein said control unit is further arranged to maintain said parameter value when said radar level gauge system is in said second state, to thereby achieve said predetermined frequency difference.

10. The radar level gauge system according to claim 7, wherein said second pulse generating circuitry comprises a controllable reactive load across said resonator element.

11. The radar level gauge system according to claim 10, further comprising:

monitoring circuitry arranged to monitor a time delay of said output signal from said resonator element relative to said first signal, when said radar level gauge system is in said first state;

a control unit arranged to control at least said reactive load across said resonator element to a reactive load value resulting in said time delay corresponding to said predetermined frequency difference.

12. The radar level gauge system according to claim 10, wherein said controllable reactive load comprises a voltage controlled capacitor.

13. The radar level gauge system according to claim 7, further comprising a delay device arranged between said first pulse generating circuitry and said propagation device for delaying said transmission signal before propagating said transmission signal towards said surface of the product contained in the tank.

14. The radar level gauge system according to claim 7, further comprising a delay device arranged between said second pulse generating circuitry and said measurement circuitry for delaying said reference signal.

15. The radar level gauge system according to claim 7, wherein:

in said first state, said output of the resonator element comprised in said second pulse generating circuitry is unconnected to said input of the resonator element comprised in said second pulse generating circuitry; and in said second state, said output of the first pulse generating circuitry is unconnected to said input of the resonator element comprised in said second pulse generating circuitry.

16. The radar level gauge system according to claim 7, wherein said resonator element comprises a crystal having a predetermined resonance frequency.

* * * * *